US008412237B1

(12) United States Patent
Ohme (10) Patent No.: US 8,412,237 B1
(45) Date of Patent: Apr. 2, 2013

(54) METHOD AND SYSTEM FOR LAUNCHING AND PREPARING APPLICATIONS ON MOBILE COMPUTING SYSTEMS BASED ON GEO-LOCATION DATA

(75) Inventor: Phillip J. Ohme, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/194,003

(22) Filed: Jul. 29, 2011

(51) Int. Cl.
*H04W 24/00* (2009.01)
(52) U.S. Cl. ............... 455/456.3; 348/14.02; 705/16
(58) Field of Classification Search ........... 455/427, 455/12.1, 553.1, 527, 456.3; 342/450, 457, 342/451; 702/150, 152; 701/207
See application file for complete search history.

(56) References Cited

U.S. PATENT DOCUMENTS

| | | | |
|---|---|---|---|
| 2006/0030332 A1* | 2/2006 | Carrott et al. ............ | 455/456.1 |
| 2007/0242131 A1* | 10/2007 | Sanz-Pastor et al. ...... | 348/14.02 |
| 2008/0005736 A1* | 1/2008 | Apacible et al. .......... | 718/100 |
| 2009/0012806 A1* | 1/2009 | Ricordi et al. ............ | 705/1 |
| 2009/0177764 A1* | 7/2009 | Blatherwick et al. ...... | 709/221 |
| 2012/0089674 A1* | 4/2012 | Staykoff .................... | 709/203 |

\* cited by examiner

*Primary Examiner* — Mahendra Patel
(74) *Attorney, Agent, or Firm* — McKay and Hodgson, LLP; Philip McKay; Sean P. Lewis (57) ABSTRACT

A user mobile computing system is provided and geo-location data indicating the position of the user mobile computing system is monitored. When an application or feature is activated or used on the user mobile computing system, activation/use data indicating the application or feature activated and use location data indicating the position of the user mobile computing system at the time of the activation/use of the application or feature is obtained and linked, mapped, and/or otherwise associated with each other, and stored. When, and if, current geo-location data for the user mobile computing system later indicates the user mobile computing system is within a defined distance of the use location associated with the application or feature, the application or feature is automatically launched and any preparation required for use of the application or feature are performed so that the application or feature is ready for use when the user mobile computing system reaches the use location.

27 Claims, 4 Drawing Sheets

METHOD AND SYSTEM FOR LAUNCHING AND PREPARING APPLICATIONS ON MOBILE COMPUTING SYSTEMS BASED ON GEO-LOCATION DATA

BACKGROUND

As mobile computing systems, such smart phones, have become more affordable and capable, users have come to rely more and more on these devices, and to expect more and more functionality from these devices.

One drawback to some applications and features associated with mobile computing systems, such as e-mail retrieval applications, texting services, and various other data providing applications and features, is that they not only must be loaded and launched but, in many cases, the applications or features require data downloads before they can provide the user the desired capabilities.

For instance, many applications, such an e-mail retrieval application running on a smart phone, not only need to be launched, but an Internet connection must be established, a link to the source of data must be made, and the available data must be downloaded and/or accessed before it can be displayed to the user. This process takes considerable time and processor cycles.

As a result, in order to at least save user time, some currently available applications, such e-mail retrieval/access applications, establish the Internet connection, link to the source of e-mail or other data, and download the available e-mails or other data on a periodic basis automatically. Some currently available applications even allow the user to set the periodic basis, i.e., the interval between events of automatically establishing the Internet connection, linking to the source of data, and downloading the available data. However, using these automatic periodic data retrieval systems, once the periodic interval between data retrieval events is established, the periodic interval is relatively static and often difficult to change. As a result, in many cases, the Internet connection is automatically established, the source of data is linked to, and the available data is downloaded, unnecessarily, i.e., when the user does not desire to, and/or cannot, view the data anyway. Consequently, using currently available periodic data retrieval systems, the mobile computing system's battery power, and various other resources such as processor cycles and/or network bandwidth, are often used unnecessarily, i.e., are wasted.

In light of the situation described above, currently, users of mobile computing system applications or features are often forced to choose between pulling data into the mobile computing system on manual demand, and then waiting a significant time for the application start up, make a data source connection, and then obtain the necessary data, or to leave the application running and have the data periodically, and automatically, pushed to the mobile computing system and application, in which case, mobile computing system resources, such as battery life, are often squandered. Clearly this situation is not ideal for either the users of the mobile computing systems and applications or the providers of the mobile computing systems and applications.

SUMMARY

In accordance with one embodiment, a method and system for automatically launching and preparing applications on a mobile computing system based on geo-location data includes a process for automatically launching and preparing applications on a mobile computing system based on geo-location data whereby, in one embodiment, a user mobile computing system is provided and geo-location data indicating the position of the user mobile computing system is monitored.

In one embodiment, when an application or feature is activated or used on the user mobile computing system, activation/use data indicating the application or feature activated and use location data indicating the position of the user mobile computing system at the time of the activation/use of the application or feature is obtained. In one embodiment, the activation/use data and use location data associated with the activation/use of the application or feature are linked, mapped, and/or otherwise associated with each other, and the linked data is stored.

In one embodiment, as the geo-location data indicating the position of the user mobile computing system continues to be monitored, when, and if, current geo-location data for the user mobile computing system indicates the position of the user mobile computing system is within a defined threshold distance of the use location indicated by the use location data associated with the application or feature, i.e., the geo-location data indicates the user mobile computing system is within a defined threshold proximity distance of the use location associated with the application or feature, the application or feature is automatically launched and any preparation required for use of the application or feature, such as the establishment of data links and/or the downloading and/or uploading of data associated with the application or feature, are performed so that the application or feature is ready for use when the user mobile computing system reaches the use location associated with the application or feature.

Using the method and system for automatically launching and preparing applications on a mobile computing system based on geo-location data, as discussed herein, geo-location data is used to ensure an application or feature is ready for use when the user mobile computing system reaches a use location associated with the application or feature. Consequently, using the method and system for automatically launching and preparing applications on a mobile computing system based on geo-location data, as discussed herein, mobile computing system resources, such as battery power, network bandwidth, and processor cycles, are only expended on applications or features when the user mobile computing system is near a use location known to be associated with the applications or features. As a result, using the method and system for automatically launching and preparing applications on a mobile computing system based on geo-location data, as discussed herein, mobile computing system resources are conserved and the applications or features a user desires are provided to the user, pre-prepared for use, when the user needs them and on a user customized basis.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

In accordance with one embodiment, a method and system for automatically launching and preparing applications on a mobile computing system based on geo-location data includes a process for automatically launching and preparing applications on a mobile computing system based on geo-location data whereby, in one embodiment, a user mobile computing system is provided.

Herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, the user mobile computing system is connected, and/or otherwise operably coupled, to one or more mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In various embodiments, the user mobile computing system is associated with a user traveling by car, bicycle, train, bus, or any other vehicle in an relatively open environment, such as outside, or in a relatively closed environment, such as a mall, stadium, or shopping center. In various embodiments, the user mobile computing system is associated with a user traveling by foot in a relatively open environment, such as outside, or in a relatively closed environment, such as a mall, stadium, or shopping center.

In one embodiment, geo-location data indicating the position of the user mobile computing system is monitored.

In various embodiments, geo-location data indicating the position of the user mobile computing system is monitored by one or more processors associated with one or more computing systems.

In one embodiment, geo-location data indicating the position of the user mobile computing system is monitored by the user mobile computing system and geo-location data is recorded/stored by the user mobile computing system.

In one embodiment, geo-location data indicating the position of the user mobile computing system is monitored by one or more processors associated with one or more computing systems other than the user mobile computing system, such as a provider computing system.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, the position of the user mobile computing system is monitored/tracked by obtaining data regarding the position of the user mobile computing system at regular intervals, such as every second, every few seconds, every minute, every few minutes, etc., using one or more processors associated with one or more computing systems.

In one embodiment, the position of the user mobile computing system is monitored/tracked based on analysis of a communication signal emitted by the user mobile computing system and/or the relay stations used by the user mobile computing system.

In various embodiments, the position of the user mobile computing system is determined using a Global Positioning Satellite (GPS) system and/or a GPS capability provided with the one or more mobile devices.

In various embodiments, the position of the user mobile computing system is provided by the user mobile computing system itself via one or more data links.

In various embodiments, the position of the user mobile computing system is determined and/or provided by any method, means, mechanism, or procedure for determining a position of a user mobile computing system as discussed herein, and/or as known in the art at the time of filing, and/or as developed after the time of filing.

Numerous means, methods, mechanisms, procedures and processes are known in the art for determining the position of a user mobile computing system. Consequently, a more detailed discussion of any particular means, methods, mechanisms, procedures and processes for determining the position of a user mobile computing system is omitted here to avoid detracting from the invention.

In one embodiment, the user's use of the user mobile computing system is monitored and when an application or feature is activated or used through the user mobile computing system, activation/use data indicating the specific application or feature activated is obtained and stored.

In various embodiments, the activation/use data includes secondary use data, such as, but not limited to: data indicating the time of day when the application or feature is activated; data indicating an orientation of the user mobile computing system when the application or feature is activated; data indicating movement and/or acceleration of the user mobile computing system when the application or feature is activated; and/or data indicating any user action, or mobile computing system state, when the application or feature is activated.

In one embodiment, the user's use of the user mobile computing system is monitored by one or more processors associated with one or more computing systems.

In one embodiment, when an application or feature is activated or used through the user mobile computing system, and the activation/use data is obtained, the geo-location data is also recorded and transformed into use location data indicating the position of the user mobile computing system at the time of the activation/use of the application or feature.

In one embodiment, the activation/use data and use location data are obtained and stored by one or more processors associated with one or more computing systems.

In one embodiment, the activation/use data and use location data are linked to each other, mapped to each other, or otherwise associated with each other.

In one embodiment, the activation/use data and use location data are linked to each other, mapped to each other, or otherwise associated with each other, by one or more processors associated with one or more computing systems.

In one embodiment, the activation/use data and use location data are linked to each other, mapped to each other, or otherwise associated with each other, and then stored.

In one embodiment, the activation/use data and use location data are linked to each other, mapped to each other, or otherwise associated with each other, and then stored under the direction of one or more processors associated with one or more computing systems.

In one embodiment, the activation/use data and use location data are linked to each other, mapped to each other, or otherwise associated with each other, and then stored in a memory associated with the user mobile computing system.

In one embodiment, the activation/use data and use location data are linked to each other, mapped to each other, or otherwise associated with each other, and then stored in a memory associated with a computing system other than the user mobile computing system, such as a provider computing system.

In one embodiment, the activation/use data and use location data are linked to each other, mapped to each other, or otherwise associated with each other, and then stored in any database, as discussed herein, and/or as known/available in the art at the time of filing, and/or as developed/made available after the time of filing.

As used herein, the term "database" includes any data storage mechanism known at the time of filing or as developed thereafter, such as, but not limited to: a data storage device; a designated server system or computing system, or a designated portion of one or more server systems or computing systems; a user mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

In one embodiment, the activation/use data and use location data are linked to each other, mapped to each other, or otherwise associated with each other, and then transferred from the user mobile computing system to the one or more other computing systems and/or a database using any means, method, process, procedure, or mechanism for transferring data from one or more devices, computing systems, server systems, databases, web site/web functions or any devices having a data storage capability to one or more other devices, computing systems, server systems, databases, web site/web functions or any devices having a data storage capability, whether known at the time of filing or as thereafter developed.

In one embodiment, the activation/use data and use location data associated with multiple activations/uses of the application or feature are aggregated and associated with the application or feature.

In one embodiment, only when the same, or similar, use location data is obtained and associated with a threshold number activations/uses of the application or feature is the activation/use data for the application or feature associated with the application or feature for the purposes of automatically launching the application or feature in accordance with the method and system for automatically launching and preparing applications on a mobile computing system based on geo-location data as discussed below. Therefore, in one embodiment, non-typical, or one time, activations/uses of an application or feature are eliminated from consideration.

In various embodiments, a threshold proximity distance is defined such that if the geo-location data for the user mobile computing system indicates a position of the user mobile computing system within the threshold proximity distance of a given use location, the user mobile computing system is considered to be headed for, or at, the use location.

In various embodiments, the threshold proximity distance is defined based on the accuracy of the geo-location data source.

In various embodiments, the threshold proximity distance is defined based on the accuracy of the geo-location data source and/or an estimate of how long it takes to launch and prepare the application or feature associated with the use location data under consideration.

In various embodiments, the threshold proximity distance is defined based on any parameters desired by the provider of the method and system for automatically launching and preparing applications on a mobile computing system based on geo-location data and/or the users of the method and system for automatically launching and preparing applications on a mobile computing system based on geo-location data.

In various embodiments, the threshold proximity distance is defined by the provider of the method and system for automatically launching and preparing applications on a mobile computing system based on geo-location data.

In various embodiments, the threshold proximity distance is defined by the user of the method and system for automatically launching and preparing applications on a mobile computing system based on geo-location data.

In one embodiment, as the geo-location data indicating the position of the user mobile computing system continues to be monitored, when, and if, current geo-location data for the user mobile computing system indicates the position of the user mobile computing system is within the defined threshold proximity distance for the application or feature of the use location indicated by the use location data associated with the application or feature, i.e., the geo-location data indicates the user mobile computing system is within a defined distance of the use location associated with the application or feature, the application or feature is automatically launched and any preparation required for use of the application or feature, such as the establishment of data links and/or the downloading/uploading of data associated with the application or feature, are performed so that the application or feature is ready for use when the user mobile computing system reaches the use location associated with the application or feature.

Various embodiments of the method and system for automatically launching and preparing applications on a mobile computing system based on geo-location data can be used, in a specific example, to check and download all new e-mail onto the user mobile computing system whenever the user leaves his or her desk or moves to his or her office from a workplace parking lot. This specific example provides the user with his or her latest work e-mails just before the user reaches his or her desk Various embodiments of the method and system for automatically launching and preparing applications on a mobile computing system based on geo-location data can be used, in a specific example, to open a mapping application whenever the user is in their garage, or on the road just outside their house or work, and obtain the user's current location. This specific example provides the user with the ability upload their present position data to a mapping application and to get map and directions data as quickly as possible when the user is on the road.

Various embodiments of the method and system for automatically launching and preparing applications on a mobile computing system based on geo-location data 300 can be used, in a specific example, to open a mapping application whenever the user is outside a known area of travel, as calculated, in one embodiment, by analyzing the monitored geo-location data, and obtain the user's current location data. This specific example, again provides the user with the ability to upload their present position data to a mapping application and get map and directions data as quickly as possible when the user is on the road and outside their normal area of travel.

Various embodiments of the method and system for automatically launching and preparing applications on a mobile computing system based on geo-location data can be used, in a specific example, to check and download all relevant data, such as new e-mail, whenever a defined location is being approached. In this example, data can downloaded before a known location where the application or feature, or the data, will be needed, or before a known "dead zone" with no reception, and the communications signal, and data link is lost; thereby giving the user the latest data update before he or she needs the application or feature, or the data, or before the user enters the known "dead zone".

Various embodiments of the method and system for automatically launching and preparing applications on a mobile computing system based on geo-location data can be used, in a specific example, to check and download all relevant data, such as new e-mail, whenever signal strength for maintaining the communications link for the user mobile computing system drops below a pre-defined level. In this example, data is downloaded before the communications signal, and data link, is lost; thereby giving the user the latest data update before he or she enters a predicted/possible "dead zone".

Various embodiments of the method and system for automatically launching and preparing applications on a mobile computing system based on geo-location data can be used, in a specific example, to launch a camera application whenever the user is a defined distance from home and/or the phone is held in landscape orientation.

Various embodiments of the method and system for automatically launching and preparing applications on a mobile computing system based on geo-location data can be used, in a specific example, to update travel data, such as TripIt™ information, whenever the user is approaching an airport.

Various embodiments of the method and system for automatically launching and preparing applications on a mobile computing system based on geo-location data can be used, in a specific example, to open and begin tracking mileage in a mileage tracking application, such as Tap2Track™, when the user drives between home and work.

Those of skill in the art will readily recognize that the specific examples above were provided for illustrative purposes only and that numerous other uses and/or applications of the method and system for automatically launching and preparing applications on a mobile computing system based on geo-location data are possible, and are envisioned. Consequently, the specific examples discussed above do not limit the scope of the claims presented below In contrast to currently available automatic periodic data retrieval systems and random timers, or simply manually activating a desired application or feature and waiting for the application or feature to be launched and prepared for use, the method and system for automatically launching and preparing applications on a mobile computing system based on geo-location data optimizes actions the user mobile computing system takes based on the user's history of use. Consequently, the method and system for automatically launching and preparing applications on a mobile computing system based on geo-location data can significantly improve the user mobile computing system's battery life and reduce network traffic; all with no visible penalty to the user.

Hardware Architecture

Figure 1:
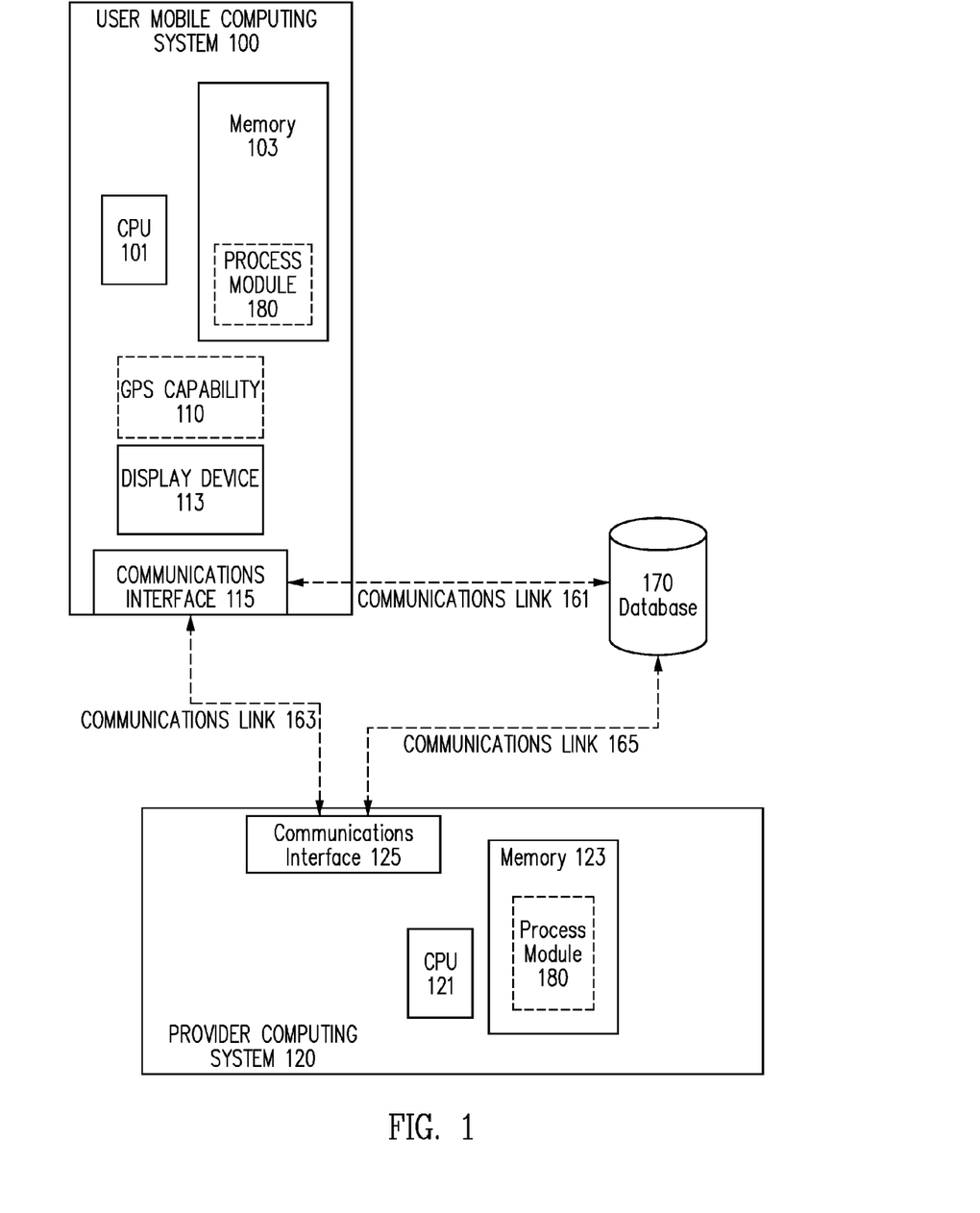
FIG. 1 is a block diagram of an exemplary hardware architecture for implementing one embodiment including a user mobile computing system, a provider computing system, and a database, connected by various communications links/channels in accordance with one embodiment.

FIG. 1 is a block diagram of an exemplary hardware architecture for implementing one embodiment of a system and method for automatically launching and preparing applications on a mobile computing system based on geo-location data, such as exemplary process 300 discussed herein, that, returning to FIG. 2, includes: a user mobile computing system 100, i.e., a first computing system; a provider computing system 120, e.g. a second computing system; and a database 170, all operatively coupled by communication links/channels 161, 163, and 165.

As noted above, herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As seen in FIG. 1, in one embodiment, user mobile computing system includes a central processing unit (CPU) 101, an optional GPS capability 110; a display device 113; a communications interface 115; and a memory system 103 including process module 180.

User mobile computing system 100 may further include standard user interface devices such as a keyboard (not shown), a mouse (not shown), a touch pad (not shown) as well as, one or more standard input/output (I/O) devices (not shown).

In one embodiment, user mobile computing system 100 is connected, and/or otherwise operably coupled, to one or more communications links/channels, such as communications links/channels 161 and 163, and/or mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Also shown in FIG. 1 is optional provider computing system 120. In various embodiments, provider computing system 120 is under the control of, accessible by, or otherwise associated with, a provider of process for automatically launching and preparing applications on a mobile computing system based on geo-location data and is used to implement at least part of a process for automatically launching and preparing applications on a mobile computing system based on geo-location data.

As shown in FIG. 1, provider computing system 120 typically includes a central processing unit (CPU) 121, communications interface 125, and a memory system 123, including process module 180.

Provider computing system may further include standard user interface devices such as a keyboard (not shown), a mouse (not shown), a printer (not shown), and a display device (not shown), as well as, one or more standard input/ output (I/O) devices (not shown), such as a compact disk (CD) or Digital Video Disc (DVD) drive, floppy disk drive, or other digital or waveform port, or other device capable of inputting data to, and outputting data from, provider computing system 120, whether available or known at the time of filing or as later developed.

As noted above, as used herein, the term "computing system" includes, but is not limited to: a desktop computing system/computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, provider computing system 120 is representative of two or more computing systems. In one embodiment, provider computing system 120 is a client computing system associated with one or more server computing systems. In one embodiment, provider computing system 120 is a server computing system that is, in turn, associated with one or more client computing systems. In one embodiment, provider computing system 120 is part of a cloud computing environment.

In one embodiment, provider computing system 120 is operatively coupled to user mobile computing system 100 via communications link/channel 163.

Also shown in FIG. 1 is database 170. In one embodiment, database 170 includes at least part of the activation/use data and/or use location data that are linked to each other, mapped to each other, or otherwise associated with each other as received from user mobile computing system 100, via communications link/channel 161, and/or provider computing system 120, via communications link/channel 165.

In one embodiment, database 170 is a data storage device, a designated server system or computing system, or a designated portion of one or more server systems or computing systems, such as computing system(s) 100 and/or 120, or a distributed database, or an external and/or portable hard drive. In one embodiment, database 170 is a dedicated mass storage device implemented in software, hardware, or a combination of hardware and software.

In one embodiment, database 170 is a web-based function. As discussed in more detail below, in one embodiment, database 170 is under the control of, or otherwise accessible by, a process for automatically launching and preparing applications on a mobile computing system based on geo-location data. In one embodiment, database 170 is part of a cloud computing environment.

In various embodiments, user mobile computing system 100, and/or provider computing system 120, and/or database 170, are all operatively coupled by communication links/ channels 161, 163, and 165. In various embodiments, any, or all, of communication links/channels 161, 163, and 165 can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

In one embodiment, user mobile computing system 100, and/or provider computing system 120, and/or database 170, are part of any cloud computing environment.

Those of skill in the art will readily recognize that the components shown in FIG. 1, and their respective sub-components, are shown for illustrative purposes only and that architectures with more or fewer components can implement, and benefit from, the invention. Moreover, one or more components of FIG. 1 may be located remotely from their respective system and accessed via any network, as discussed herein. In addition, the particular type of, and configuration of, user mobile computing system 100, provider computing system 120, and database 170 are not relevant.

Figure 2:
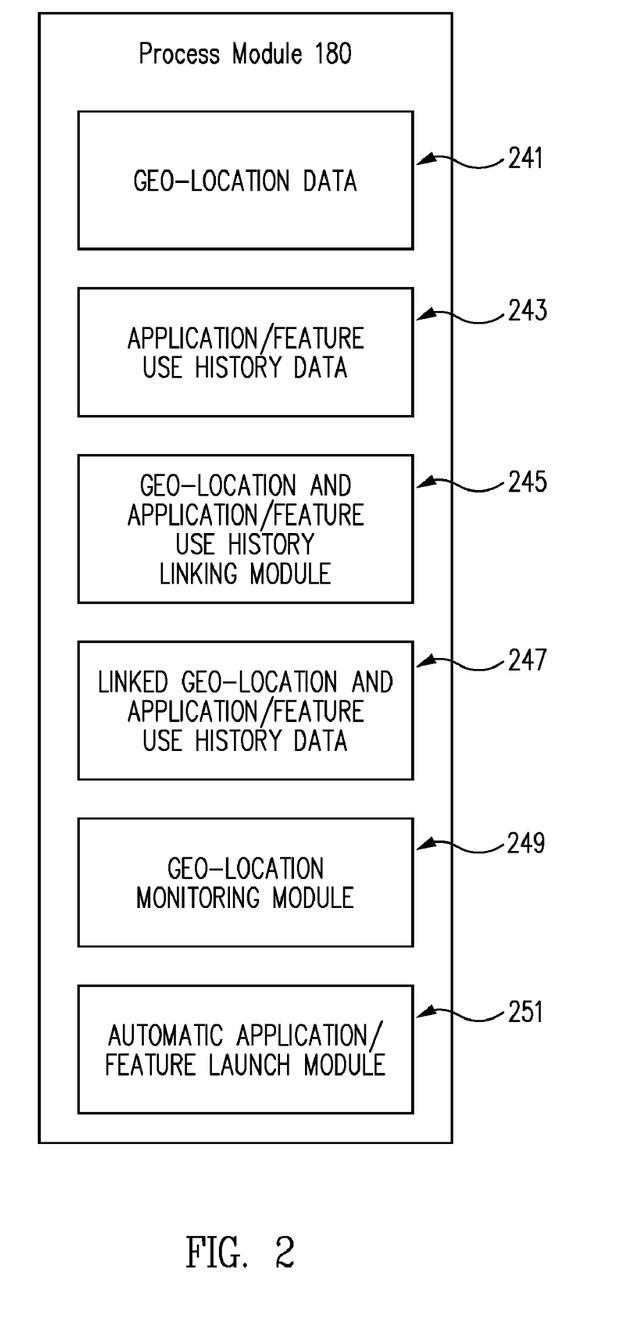
FIG. 2 is a block diagram of an exemplary memory system process module associated with the user mobile computing system and/or provider computing system of FIG. 1, in accordance with one embodiment.
Figure 3:
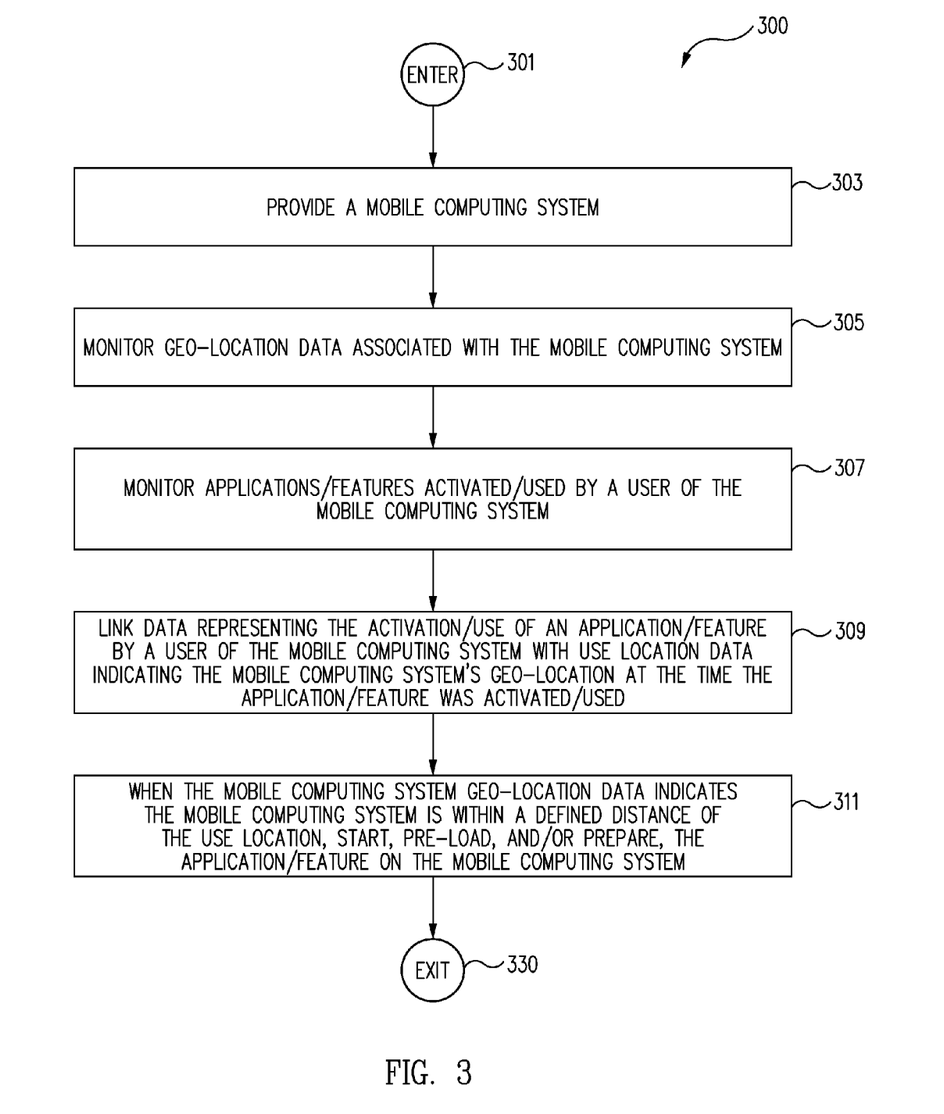
FIG. 3 is a flow chart depicting one embodiment of a process for automatically launching and preparing applications on a mobile computing system based on geo-location data in accordance with one embodiment.

FIG. 2 shows a more detailed block diagram of process module 180 of FIG. 1. As seen in FIG. 2, process module 180 can store data and/or instructions associated with, but not limited to, a process for automatically launching and preparing applications on a mobile computing system based on geo-location data, such as process 300 of FIG. 3.

As also seen in FIG. 2, process module 180 includes geo-location data 241 that includes procedures, data, and/or instructions, for obtaining and/or storing geo-location data and/or use location data indicating the position of user mobile computing system 100 (FIG. 1).

As also seen in FIG. 2, in one embodiment, process module 180 includes application/feature use history data 243 that includes procedures, data, and/or instructions, for obtaining and/or storing activation/use data indicating the specific application or feature activated by a user through user mobile computing system 100 (FIG. 1).

As also seen in FIG. 2, in one embodiment, process module 180 includes geo-location and application/feature use history linking module 245 that includes procedures, data, and/or instructions, whereby the activation/use data of application/feature use history data 243 and use location data of geo-location data 241 associated with a specific activation/use of the of application/feature are linked to each other, mapped to each other, or otherwise associated with each other.

As also seen in FIG. 2, in one embodiment, process module 180 includes linked geo-location and application/feature use history data 247 that includes procedures, data, and/or instructions, for obtaining and storing the activation/use data of application/feature use history data 243 and use location data of geo-location data 241 as linked to each other, mapped to each other, or otherwise associated with each other, at geo-location and application/feature use history linking module 245.

As also seen in FIG. 2, in one embodiment, process module 180 includes geo-location monitoring module 249 that includes procedures, data, and/or instructions, for monitoring the geo-location data indicating the position of mobile computing system 100 and comparing current geo-location data with the use location data of linked geo-location and application/feature use history data 247.

As also seen in FIG. 2, in one embodiment, process module 180 includes automatic application/feature launch module 251 that includes procedures, data, and/or instructions, for when, and if, geo-location data for the user mobile computing system of geo-location monitoring module 249 indicates the position of mobile computing system 100 is within a defined threshold proximity distance for the application or feature of the use location indicated by the use location data of linked geo-location and application/feature use history data 247 associated with the application or feature of linked geo-location and application/feature use history data 247, automatically launching the application or feature and performing any preparation required for use of the application or feature, such as the establishment of data links and/or the downloading/uploading of data associated with the application or feature, so that the application or feature is ready for use when mobile computing system 100 reaches the use location associated with the application or feature.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

Process

In accordance with one embodiment, a method and system for automatically launching and preparing applications on a mobile computing system based on geo-location data includes a process for automatically launching and preparing applications on a mobile computing system based on geo-location data whereby, in one embodiment, a user mobile computing system is provided and geo-location data indicating the position of the user mobile computing system is monitored.

In one embodiment, when an application or feature is activated or used on the user mobile computing system, activation/use data indicating the application or feature activated and use location data indicating the position of the user mobile computing system at the time of the activation/use of the application or feature is obtained. In one embodiment, the activation/use data and use location data associated with the activation/use of the application or feature are linked, mapped, and/or otherwise associated with each other, and the linked data is stored. In one embodiment, the activation/use data and use location data associated with multiple activations/uses of the application or feature are aggregated and associated with the application or feature.

In one embodiment, as the geo-location data indicating the position of the user mobile computing system continues to be monitored, when, and if, current geo-location data for the user mobile computing system indicates the position of the user mobile computing system is within a defined threshold distance of the use location indicated by the use location data associated with the application or feature, i.e., the geo-location data indicates the user mobile computing system is within a defined distance of the use location associated with the application or feature, the application or feature is automatically launched and any preparation required for use of the application or feature, such as the establishment of data links and/or the downloading of data associated with the application or feature, are performed so that the application or feature is ready for use when the user mobile computing system reaches the use location associated with the application or feature.

FIG. 3 is a flow chart depicting a process for automatically launching and preparing applications on a mobile computing system based on geo-location data 300 in accordance with one embodiment. Process for automatically launching and preparing applications on a mobile computing system based on geo-location data 300 begins at ENTER OPERATION 301 of FIG. 3 and process flow proceeds to PROVIDE A MOBILE COMPUTING SYSTEM OPERATION 303.

In one embodiment, at PROVIDE A MOBILE COMPUTING SYSTEM OPERATION 303 a user mobile computing system is provided.

Herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, at PROVIDE A MOBILE COMPUTING SYSTEM OPERATION 303 a user mobile computing system, such as user mobile computing system 100 of FIG. 1, is provided.

In one embodiment, the user mobile computing system is connected, and/or otherwise operably coupled, to one or more communications links/channels, such as communications links/channels 1651 and/or 163 of FIG. 1, and/or mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In various embodiments, the user mobile computing system is associated with a user traveling by car, bicycle, train, bus, or any other vehicle in an relatively open environment, such as outside, or in a relatively closed environment, such as a mall, stadium, or shopping center. In various embodiments, the user mobile computing system is associated with a user traveling by foot in a relatively open environment, such as outside, or in a relatively closed environment, such as a mall, stadium, or shopping center.

Returning to FIG. 3, once a user mobile computing system is provided at PROVIDE A MOBILE COMPUTING SYSTEM OPERATION 303, process flow proceeds to MONITOR GEO-LOCATION DATA ASSOCIATED WITH THE MOBILE COMPUTING SYSTEM OPERATION 305.

In one embodiment, at MONITOR GEO-LOCATION DATA ASSOCIATED WITH THE MOBILE COMPUTING SYSTEM OPERATION 305 geo-location data indicating the position of the user mobile computing system is monitored and/or recorded.

In various embodiments, at MONITOR GEO-LOCATION DATA ASSOCIATED WITH THE MOBILE COMPUTING SYSTEM OPERATION 305 geo-location data indicating the position of the user mobile computing system is monitored by one or more processors, such as CPU 101 and/or CPU 121 of FIG. 1, associated with one or more computing systems, such as user mobile computing system 100 and/or provider computing system 120 of FIG. 1.

Returning to FIG. 3, in one embodiment, at MONITOR GEO-LOCATION DATA ASSOCIATED WITH THE MOBILE COMPUTING SYSTEM OPERATION 305 geo-location data indicating the position of the user mobile computing system is monitored by the user mobile computing system and geo-location data, such as geo-location data 241 of FIG. 2, is recorded/stored by user mobile computing system 100.

Returning to FIG. 3, in one embodiment, at MONITOR GEO-LOCATION DATA ASSOCIATED WITH THE MOBILE COMPUTING SYSTEM OPERATION 305 geo-location data indicating the position of the user mobile computing system is monitored by one or more processors, such as CPU 121 of FIG. 1, associated with one or more computing systems other than the user mobile computing system, such as provider computing system 120 of FIG. 1.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Returning to FIG. 3, in one embodiment, at MONITOR GEO-LOCATION DATA ASSOCIATED WITH THE MOBILE COMPUTING SYSTEM OPERATION 305 the position of the user mobile computing system is monitored/tracked by obtaining data regarding the position of the user mobile computing system at regular intervals, such as every second, every few seconds, every minute, every few minutes, etc., using one or more processors associated with one or more computing systems, such as user mobile computing system 100 and/or provider computing system 120 of FIG. 1.

Returning to FIG. 3, in one embodiment, at MONITOR GEO-LOCATION DATA ASSOCIATED WITH THE MOBILE COMPUTING SYSTEM OPERATION 305 the position of the user mobile computing system is monitored/tracked based on analysis of a communication signal emitted by the user mobile computing system and/or the relay stations used by the user mobile computing system.

In various embodiments, at MONITOR GEO-LOCATION DATA ASSOCIATED WITH THE MOBILE COMPUTING SYSTEM OPERATION 305 the position of the user mobile computing system is determined using a Global Positioning Satellite (GPS) system and/or a GPS capability, such as optional GPS capability 110 of FIG. 1, provided with user mobile computing system 100.

Returning to FIG. 3, in one embodiment, at MONITOR GEO-LOCATION DATA ASSOCIATED WITH THE MOBILE COMPUTING SYSTEM OPERATION 305, the position of the user mobile computing system is provided by the user mobile computing system itself via one or more data links and/or communication links/channels, such as communications links/channels 161 and/or 1653 of FIG. 1.

Returning to FIG. 3, in various embodiments, at MONITOR GEO-LOCATION DATA ASSOCIATED WITH THE MOBILE COMPUTING SYSTEM OPERATION 305 the position of the user mobile computing system is determined and/or provided by any method, means, mechanism, or procedure for determining a position of a user mobile computing system as discussed herein, and/or as known in the art at the time of filing, and/or as developed after the time of filing.

Numerous means, methods, mechanisms, procedures and processes are known in the art for determining the position of a user mobile computing system. Consequently, a more detailed discussion of any particular means, methods, mechanisms, procedures and processes for determining the position of a user mobile computing system is omitted here to avoid detracting from the invention.

In one embodiment, once geo-location data indicating the position of the user mobile computing system is monitored and/or recorded at MONITOR GEO-LOCATION DATA ASSOCIATED WITH THE MOBILE COMPUTING SYSTEM OPERATION 305, process flow proceeds to MONITOR APPLICATIONS/FEATURES ACTIVATED/USED BY A USER OF THE MOBILE COMPUTING SYSTEM OPERATION 307.

In one embodiment, at MONITOR APPLICATIONS/FEATURES ACTIVATED/USED BY A USER OF THE MOBILE COMPUTING SYSTEM OPERATION 307 the user's use of the user mobile computing system of PROVIDE A MOBILE COMPUTING SYSTEM OPERATION 303 is monitored and when an application or feature is activated or used through the user mobile computing system, activation/use data indicating the specific application or feature activated is obtained and stored.

In one embodiment, at MONITOR APPLICATIONS/FEATURES ACTIVATED/USED BY A USER OF THE MOBILE COMPUTING SYSTEM OPERATION 307 the user's use of the user mobile computing system of PROVIDE A MOBILE COMPUTING SYSTEM OPERATION 303 is monitored and when an application or feature is activated or used through the user mobile computing system, activation/use data indicating the specific application or feature activated is obtained and stored as application/feature use history data, such as application/feature use history data 243 of FIG. 2.

Returning to FIG. 3, in various embodiments, the activation/use data includes secondary use data, such as, but not limited to: data indicating the time of day when the application or feature is activated; data indicating an orientation of the user mobile computing system when the application or feature is activated; data indicating movement and/or acceleration of the user mobile computing system when the application or feature is activated; and/or data indicating any user action, or user mobile computing system state, when the application or feature is activated.

In one embodiment, the user's use of the user mobile computing system is monitored by one or more processors, such as CPU 101 and/or CPU 121 of FIG. 1, associated with one or more computing systems, such as user mobile computing system 100 and/or provider computing system 120 of FIG. 1.

Returning to FIG. 3, in one embodiment, once the user's use of the user mobile computing system of PROVIDE A MOBILE COMPUTING SYSTEM OPERATION 303 is monitored and activation/use data indicating the specific application or feature activated is obtained and stored at MONITOR APPLICATIONS/FEATURES ACTIVATED/USED BY A USER OF THE MOBILE COMPUTING SYSTEM OPERATION 307, process flow proceeds to LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309.

In one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 when an application or feature is activated or used through the user mobile computing system, and the activation/use data is obtained at MONITOR APPLICATIONS/FEATURES ACTIVATED/USED BY A USER OF THE MOBILE COMPUTING SYSTEM OPERATION 307, the geo-location data of MONITOR GEO-LOCATION DATA ASSOCIATED WITH THE MOBILE COMPUTING SYSTEM OPERATION 305 is also recorded and transformed into use location data indicating the position of the user mobile computing system at the time of the activation/use of the application or feature.

In one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309, the activation/use data and use location data are obtained and stored by one or more processors, such as CPU 101 and/or CPU 121 of FIG. 1, associated with one or more computing systems, such as user mobile computing system 100 and/or provider computing system 120 of FIG. 1.

Returning to FIG. 3, in one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the activation/use data and use location data are linked to each other, mapped to each other, or otherwise associated with each other.

In one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the activation/use data and use location data are linked to each other, mapped to each other, or otherwise associated with each other, by one or more processors, such as CPU 101 and/or CPU 121 of FIG. 1, associated with one or more computing systems, such as user mobile computing system 100 and/or provider computing system 120 of FIG. 1.

Returning to FIG. 3, in one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the activation/use data and use location data are linked to each other, mapped to each other, or otherwise associated with each other, and then stored.

In one embodiment, the activation/use data and use location data are linked to each other, mapped to each other, or otherwise associated with each other, and then stored under the direction of one or more processors, such as CPU 101 and/or CPU 121 of FIG. 1, associated with one or more computing systems, such as user mobile computing system 100 and/or provider computing system 120 of FIG. 1.

Returning to FIG. 3, in one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the activation/use data and use location data are linked to each other, mapped to each other, or otherwise associated with each other, and then stored in a memory associated with the user mobile computing system, such as memory 103 of FIG. 1, and process module 180 of FIGS. 1 and 2.

Returning to FIG. 3, in one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the activation/use data and use location data are linked to each other, mapped to each other, or otherwise associated with each other, and then stored in a memory associated with a computing system other than the user mobile computing system, such as memory 123 of FIG. 1, and process module 180 of FIGS. 1 and 2.

Returning to FIG. 3, in one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the activation/use data and use location data are linked to each other, mapped to each other, or otherwise associated with each other, via a geo-location and application/feature use history linking module, such as application/feature use history linking module 245 of FIG. 2, and stored as linked application/feature use history data, such as linked application/feature use history data 247 of FIG. 2.

Returning to FIG. 3, in one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the activation/use data and use location data are linked to each other, mapped to each other, or otherwise associated with each other, and then stored in any database, as discussed herein, such as database 170 of FIG. 1, and/or as known/available in the art at the time of filing, and/or as developed/made available after the time of filing.

As used herein, the term "database" includes any data storage mechanism known at the time of filing or as developed thereafter, such as, but not limited to: a data storage device; a designated server system or computing system, or a designated portion of one or more server systems or computing systems; a user mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

Returning to FIG. 3, in one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the activation/use data and use location data are linked to each other, mapped to each other, or otherwise associated with each other, and then transferred from the user mobile computing system to the one or more other computing systems, and/or a database, using any means, method, process, procedure, or mechanism for transferring data from one or more devices, computing systems, server systems, databases, web site/web functions or any devices having a data storage capability to one or more other devices, computing systems, server systems, databases, web site/web functions or any devices having a data storage capability, whether known at the time of filing or as thereafter developed.

In one embodiment, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the activation/use data and use location data associated with multiple activations/uses of the application or feature are aggregated and associated with the application or feature.

In one embodiment, only when the same, or similar, use location data is obtained and associated with a threshold number activations/uses of a given application or feature is the activation/use data for the application or feature associated with the application or feature for the purposes of automatically launching the application or feature in accordance with process for automatically launching and preparing applications on a mobile computing system based on geo-location data 300. Therefore, in one embodiment, non-typical, or one time, activations/uses of an application or feature are eliminated from consideration.

In various embodiments, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 a threshold proximity distance is defined such that if the geo-location data for the user mobile computing system indicates a position of the user mobile computing system within the threshold proximity distance of a use location, the user mobile computing system is considered to be headed for, or at, the use location.

In various embodiments, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the threshold proximity distance is defined based on the accuracy of the geo-location data source.

In various embodiments, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTI- VATED/USED OPERATION 309 the threshold proximity distance is defined based on the accuracy of the geo-location data source and/or an estimate of how long it takes to launch and prepare the application or feature associated with the use location data under consideration.

In various embodiments, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the threshold proximity distance is defined based on any parameters desired by the provider of process for automatically launching and preparing applications on a mobile computing system based on geo-location data 300 and/or the users of process for automatically launching and preparing applications on a mobile computing system based on geo-location data 300.

In various embodiments, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the threshold proximity distance is defined by the provider of process for automatically launching and preparing applications on a mobile computing system based on geo-location data.

In various embodiments, at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309 the threshold proximity distance is defined by the user of process for automatically launching and preparing applications on a mobile computing system based on geo-location data 300.

Figure 4:
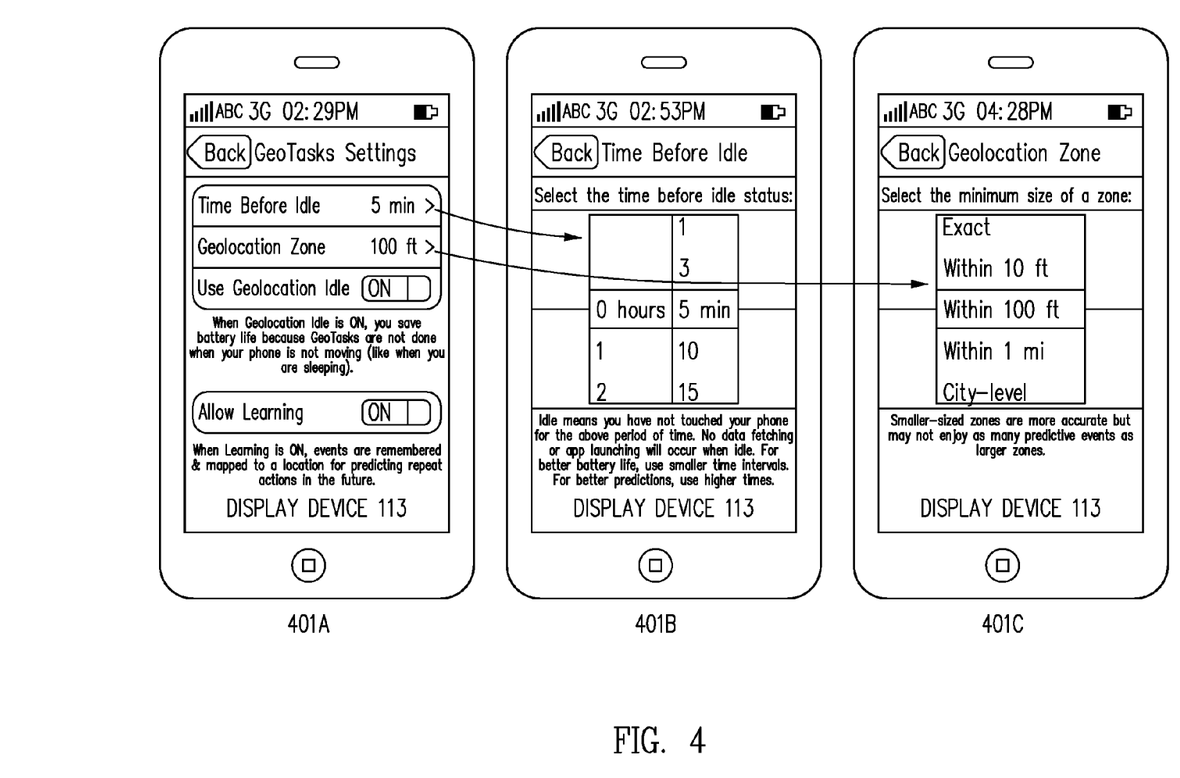
FIG. 4 is an illustrative example of three user interface displays as displayed on a display device of an exemplary user mobile computing system in accordance with one embodiment.

FIG. 4 shows an illustrative example of three user interface displays, 401A, 401B, and 401C, as displayed on a display device, such as display device 113 of FIG. 1, of an exemplary user mobile computing system, such as user mobile computing system 100, in accordance with one embodiment.

As seen in FIG. 4, and user interface display 401A, in this specific illustrative example of one embodiment, a user can activate ("ON"), or deactivate ("OFF"), a learning mode for process for automatically launching and preparing applications on a mobile computing system based on geo-location data 300 whereby process for automatically launching and preparing applications on a mobile computing system based on geo-location data 300 is turned on or turned off.

As seen in FIG. 4, and user interface displays 401A and 401B, in this specific illustrative example of one embodiment, the user can activate a geo-location idle mode (401A) which, when activated, prevents application launching and data retrieval if the user mobile device has not been touched, or moved, for the idle time. In one embodiment, the idle time period is selected from the menu of user interface display 401B.

As seen in FIG. 4, and user interface displays 401A and 401C, in this specific illustrative example of one embodiment, the user can activate a geo-location zone feature (401A) and then define a threshold proximity distance from the menu of user interface display 401C. In this specific illustrative example of one embodiment, the user has selected a threshold proximity distance of 100 ft.

Returning to FIG. 3, in one embodiment, once when an application or feature is activated or used through the user mobile computing system, and the activation/use data is obtained at MONITOR APPLICATIONS/FEATURES ACTIVATED/USED BY A USER OF THE MOBILE COMPUTING SYSTEM OPERATION 307, the geo-location data of MONITOR GEO-LOCATION DATA ASSOCIATED WITH THE MOBILE COMPUTING SYSTEM OPERATION 305 is also recorded and transformed into use location data indicating the position of the user mobile computing system at the time of the activation/use of the application or feature at LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309, process flow proceeds to WHEN THE MOBILE COMPUTING SYSTEM GEO-LOCATION DATA INDICATES THE MOBILE COMPUTING SYSTEM IS WITHIN A DEFINED DISTANCE OF THE USE LOCATION, START, PRE-LOAD, AND/OR PREPARE, THE APPLICATION/FEATURE ON THE MOBILE COMPUTING SYSTEM OPERATION 311.

In one embodiment, the geo-location data indicating the position of the user mobile computing system continues to be monitored at MONITOR GEO-LOCATION DATA ASSOCIATED WITH THE MOBILE COMPUTING SYSTEM OPERATION 303. In one embodiment, when, and if, current geo-location data for the user mobile computing system of PROVIDE A MOBILE COMPUTING SYSTEM OPERATION 303 indicates the position of the user mobile computing system is within the defined threshold proximity distance for the application or feature of the use location indicated by the use location data associated with the application or feature of LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309, then at WHEN THE MOBILE COMPUTING SYSTEM GEO-LOCATION DATA INDICATES THE MOBILE COMPUTING SYSTEM IS WITHIN A DEFINED DISTANCE OF THE USE LOCATION, START, PRE-LOAD, AND/OR PREPARE, THE APPLICATION/FEATURE ON THE MOBILE COMPUTING SYSTEM OPERATION 311 the application or feature of LINK DATA REPRESENTING THE ACTIVATION/USE OF AN APPLICATION/FEATURE BY A USER OF THE MOBILE COMPUTING SYSTEM WITH USE LOCATION DATA INDICATING THE MOBILE COMPUTING SYSTEM'S GEO-LOCATION AT THE TIME THE APPLICATION/FEATURE WAS ACTIVATED/USED OPERATION 309, is automatically launched and any preparation required for use of the application or feature, such as the establishment of data links and/or the downloading/uploading of data associated with the application or feature, are performed so that the application or feature is ready for use when the user mobile computing system reaches the use location associated with the application or feature.

Various embodiments of the process for automatically launching and preparing applications on a mobile computing system based on geo-location data 300 can be used, in a specific example, to check and download all new e-mail onto the user mobile computing system whenever the user leaves his or her desk or moves to his or her office from a workplace parking lot. This specific example provides the user with his or her latest work e-mails just before the user reaches a location where the user will view the e-mails.

Various embodiments of the process for automatically launching and preparing applications on a mobile computing system based on geo-location data 300 can be used, in a specific example, to open a mapping application whenever the user is in their garage, or on the road just outside their house or work, and obtain the user's current location. This specific example, provides the user with the ability to upload their present position data to a mapping application and to get map and directions data as quickly as possible when the user is on the road.

Various embodiments of the process for automatically launching and preparing applications on a mobile computing system based on geo-location data 300 can be used, in a specific example, to open a mapping application whenever the user is outside a known area of travel, as calculated, in one embodiment, by analyzing the monitored geo-location data, and obtain the user's current location data. This specific example, again provides the user with the ability to upload their present position data to a mapping application and get map and directions data as quickly as possible when the user is on the road and outside their normal area of travel.

Various embodiments of the process for automatically launching and preparing applications on a mobile computing system based on geo-location data 300 can be used, in a specific example, to check and download all relevant data, such as new e-mail, whenever a defined location is being approached. In this example, data can downloaded before a known location where the application or feature, or the data, will be needed, or before a known "dead zone" is reached with no reception, and the communications signal, and data link is lost; thereby giving the user the latest data update before he or she needs the application or feature, or the data, or before the user enters the known "dead zone".

Various embodiments of the process for automatically launching and preparing applications on a mobile computing system based on geo-location data 300 can be used, in a specific example, to check and download all relevant data, such as new e-mail, whenever signal strength for maintaining the communications link with for the user mobile computing system drops below a pre-defined level. In this example, data is downloaded before the communications signal, and data link, is lost; thereby giving the user the latest data update before he or she enters a predicted/possible "dead zone".

Various embodiments of the process for automatically launching and preparing applications on a mobile computing system based on geo-location data 300 can be used, in a specific example, to launch a camera application whenever the user is a defined distance from home and/or the phone is held in landscape orientation.

Various embodiments of the process for automatically launching and preparing applications on a mobile computing system based on geo-location data 300 can be used, in a specific example, to update travel data, such as TripIt™ information, whenever the user is approaching an airport.

Various embodiments of the process for automatically launching and preparing applications on a mobile computing system based on geo-location data 300 can be used, in a specific example, to open and begin tracking mileage in a mileage tracking application, such as Tap2Track™, when the user drives between home and work.

Those of skill in the art will readily recognize that the specific examples above were provided for illustrative purposes only and that numerous other uses and/or applications of process for automatically launching and preparing applications on a mobile computing system based on geo-location data 300 are possible, and are envisioned. Consequently, the specific examples discussed above do not limit the scope of the claims presented below In contrast to currently available automatic periodic data retrieval systems and random timers, or manually activating a desired application or feature and waiting for the application or feature to be launched and prepared for use, process for automatically launching and preparing applications on a mobile computing system based on geo-location data 300 optimizes actions the user mobile computing system takes based on the user's history of use. Consequently, process for automatically launching and preparing applications on a mobile computing system based on geo-location data 300 can significantly improve the user mobile computing system's battery life and reduce network traffic; all with no visible penalty to the user.

In one embodiment, once the application or feature is automatically launched and any preparation required for use of the application or feature, such as the establishment of data links and/or the downloading/uploading of data associated with the application or feature, are performed so that the application or feature is ready for use when the user mobile computing system reaches the use location associated with the application or feature at WHEN THE MOBILE COMPUTING SYSTEM GEO-LOCATION DATA INDICATES THE MOBILE COMPUTING SYSTEM IS WITHIN A DEFINED DISTANCE OF THE USE LOCATION, START, PRE-LOAD, AND/OR PREPARE, THE APPLICATION/FEATURE ON THE MOBILE COMPUTING SYSTEM OPERATION 311, process flow proceeds to EXIT OPERATION 330. In one embodiment, at EXIT OPERATION 330 process for automatically launching and preparing applications on a mobile computing system based on geo-location data 300 is exited to await new data.

In the discussion above, certain aspects of one embodiment include process steps or operations or instructions described herein for illustrative purposes in a particular order or grouping. However, the particular order or grouping shown and discussed herein are illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein do not limit the scope of the invention as claimed below.

Using one embodiment of process for automatically launching and preparing applications on a mobile computing system based on geo-location data 300, geo-location data is used to ensure an application or feature is ready for use when the user mobile computing system reaches a use location associated with the application or feature. Consequently, using process for automatically launching and preparing applications on a mobile computing system based on geo-location data 300, mobile computing system resources, such as battery power, communications link/channel bandwidth, and processor cycles, are only expended on applications or features when the user mobile computing system is near a use location known to be associated with the applications or features. As a result, using process for automatically launching and preparing applications on a mobile computing system based on geo-location data 300, mobile computing system resources are conserved and the applications or features a user desires are provided to the user, pre-prepared for use, when the user needs them and on a user customized basis.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s and discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for launching and preparing applications on a mobile computing system based on geo-location data comprising:
  monitoring geo-location data associated with a mobile computing system, the geo-location data indicating a first position of the mobile computing system;
  monitoring the use of applications through the mobile computing system;
  determining a mobile computing system application that has been used through the mobile computing system;
  responsive to the determination, obtaining use data indicating the specific application used and geo-location data indicating the position of the mobile computing system at the time of the use of the application, the use data at least indicating a first movement and acceleration of the mobile computing system when the application was used;
  correlating the use data indicating the specific application used and the location data associated with the use of the application;
  storing the correlated use data and the location data;

defining a threshold proximity distance;
determining that a current position, using the geo-location data, that the mobile computing system is within the threshold proximity distance of the first position indicated by the stored geo-location data, the determination further including determining that a current movement of the mobile computing system matches the first movement and acceleration;
launching, based on the current position and movement determination, the associated application on the mobile computing system.

2. The method of claim 1, wherein:
the mobile computing system is a mobile phone.

3. The method of claim 1, wherein:
the geo-location data is obtained from a GPS capability associated with the mobile computing system.

4. The method of claim 1, wherein:
at least part of the correlated use data indicating the specific application used and the location data associated with the use of the application is stored in a memory associated with the mobile computing system.

5. The method of claim 1, wherein:
at least part of the correlated use data indicating the specific application used and the location data associated with the use of the application is stored in a memory associated with a provider computing system distinct from the mobile computing system.

6. The method of claim 1, wherein:
the threshold proximity distance is defined based, at least in part, on an estimated time required to launch the application on the mobile computing system.

7. The method of claim 1, wherein:
when the geo-location data associated with the mobile computing system indicates the mobile computing system is within the threshold proximity distance of the use location data associated with the use of the application, in addition to automatically launching the application on the mobile computing system, data associated with the application is downloaded from, and/or uploaded to, the application.

8. The method of claim 1, wherein:
the application is an e-mail accessing application.

9. The method of claim 1, wherein:
the application is a mapping application.

10. A computing system implemented process for launching and preparing applications on a mobile computing system based on geo-location data comprising the following, which when executed individually or collectively by any set of one or more processors perform a process comprising:
monitoring geo-location data associated with a mobile computing system;
monitoring the use of applications or features through the mobile computing system;
determining a mobile computing system application that has been used through the mobile computing system;
responsive to the determination, obtaining use data indicating the specific application used and the geo-location data indicating the position of the mobile computing system at the time of the activation or use of the application, the use data at least indicating a first movement and acceleration of the mobile computing system when the application was used;
correlating the use data indicating the specific application or feature used and the location data associated with the use of the application;
storing the correlated use data and the location data;
defining a threshold proximity distance;
determining that a current position, using the geo-location data, that the mobile computing system is within the threshold proximity distance of the first position indicated by the stored geo-location data, the determination further including determining that a current movement of the mobile computing system matches the first movement and acceleration;
launching, based on the current position and movement determination, the application on the mobile computing system.

11. The computing system implemented process of claim 10, wherein:
the mobile computing system is a mobile phone.

12. The computing system implemented process of claim 10, wherein:
the geo-location data associated with the mobile computing system is obtained from a GPS capability associated with the mobile computing system.

13. The computing system implemented process of claim 10, wherein:
at least part of the correlated use data indicating the specific application used and the location data associated with the activation or use of the application is stored in a memory associated with the mobile computing system.

14. The computing system implemented process of claim 10, wherein:
at least part of the correlated use data indicating the specific application used and the location data associated with the activation or use of the application is stored in a memory associated with a provider computing system distinct from the mobile computing system.

15. The computing system implemented process of claim 10, wherein:
the threshold proximity distance is defined based, at least in part, on the estimated time required to launch the application on the mobile computing system.

16. The computing system implemented process of claim 10, wherein:
when the geo-location data associated with the mobile computing system indicates the mobile computing system is within the threshold proximity distance of the use location data associated with the activation or use of the application, in addition to using one or more processors associated with one or more computing systems to automatically launch the application on the mobile computing system, using one or more processors associated with one or more computing systems to download and/or upload data associated with the application to the application.

17. The computing system implemented process of claim 10, wherein:
the application is an e-mail accessing application.

18. The computing system implemented process of claim 10, wherein:
the application is mapping application.

19. A computer readable medium comprising:
a nontransitory computer readable medium having stored thereon instructions which when executed by any set of one or more computing processors perform a process comprising:
monitoring geo-location data associated with a mobile computing system, the geo-location data indicating a first position of the mobile computing system;
monitoring the use of applications through the mobile computing system;
determining a mobile computing system application that has been used through the mobile computing system;

responsive to the determination, obtaining use data indicating the specific application used and geo-location data indicating the position of the mobile computing system at the time of the use of the application, the use data at least indicating a first movement and acceleration of the mobile computing system when the application was used;

correlating the use data indicating the specific application used and the location data associated with the use of the application;

storing the correlated use data and the location data;

defining a threshold proximity distance;

determining that a current position, using the geo-location data, that the mobile computing system is within the threshold proximity distance of the first position indicated by the stored geo-location data, the determination further including determining that a current movement of the mobile computing system matches the first movement and acceleration;

launching, based on the current position and movement determination, the associated application on the mobile computing system.

20. The computer readable medium of claim 19, wherein: the mobile computing system is a mobile phone.

21. The computer readable medium of claim 19, wherein: the geo-location data is obtained from a GPS capability associated with the mobile computing system.

22. The computer readable medium of claim 19, wherein: at least part of the correlated use data indicating the specific application used and the location data associated with the use of the application is stored in a memory associated with the mobile computing system.

23. The computer readable medium of claim 19, wherein: at least part of the correlated use data indicating the specific application used and the location data associated with the use of the application is stored in a memory associated with a provider computing system distinct from the mobile computing system.

24. The computer readable medium of claim 19, wherein: the threshold proximity distance is defined based, at least in part, on an estimated time required to launch the application on the mobile computing system.

25. The computer readable medium of claim 19, wherein: when the geo-location data associated with the mobile computing system indicates the mobile computing system is within the threshold proximity distance of the use location data associated with the use of the application, in addition to automatically launching the application on the mobile computing system, data associated with the application is downloaded from, and/or uploaded to, the application.

26. The computer readable medium of claim 19, wherein: the application is an e-mail accessing application.

27. The computer readable medium of claim 19, wherein: the application is a mapping application.

* * * * *